Patented May 18, 1954

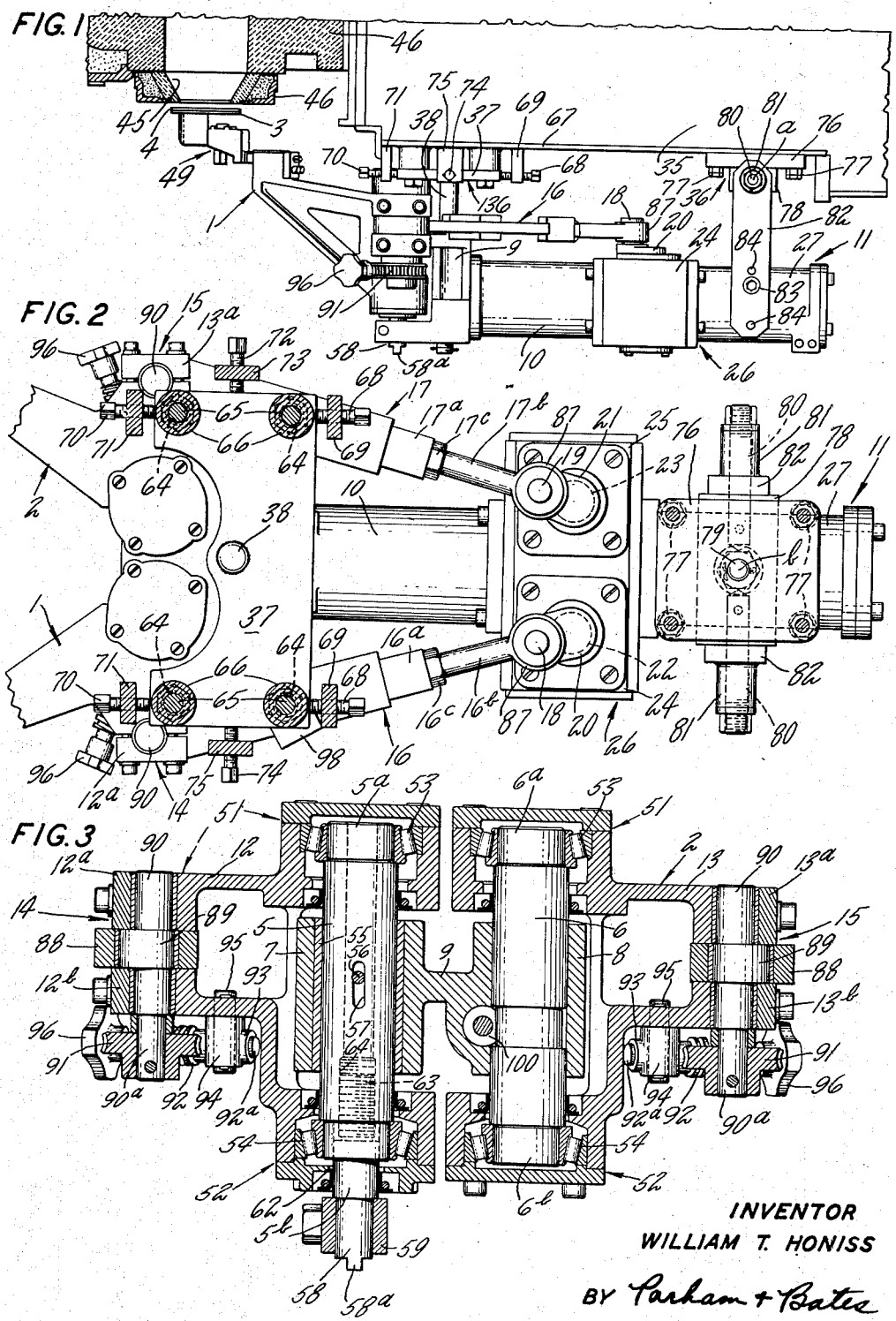

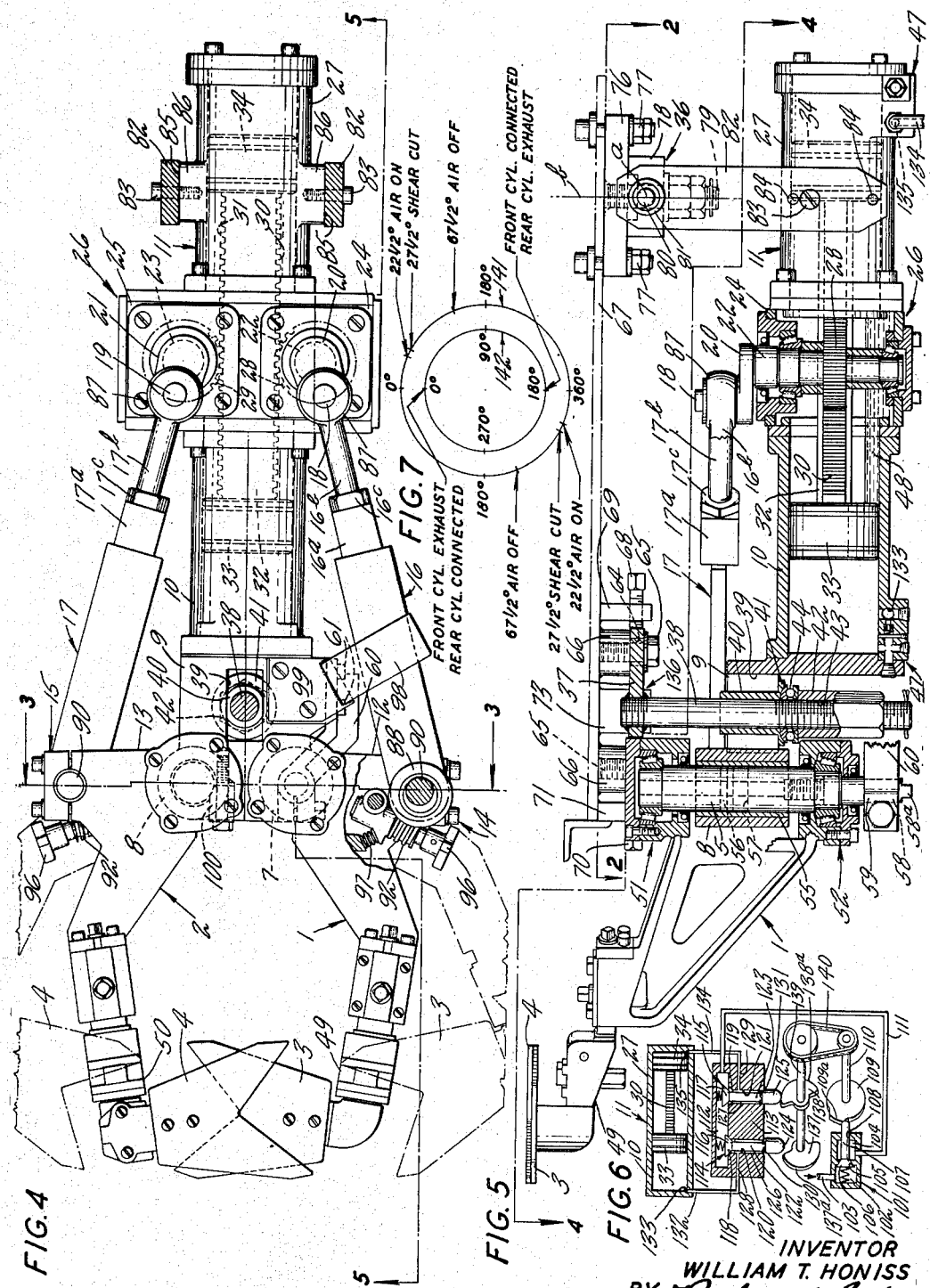

2,678,518

UNITED STATES PATENT OFFICE 2,678,518

HIGH TORQUE SHEARS

William T. Honiss, West Hartford, Conn., assignor to Emhart Manufacturing Company, Hartford, Conn., a corporation of Delaware Application July 18, 1951, Serial No. 237,342

7 Claims. (Cl. 49—14)

This invention relates to improvements in mechanisms for severing molten glass and more particularly to a severing mechanism having co-operative shear blades operatively connected to the piston of a fluid pressure actuated motor so as to be closed to sever a stream or column of molten glass issuing downwardly from the outlet of a glass feeder at about the midstroke of the motor piston and to be opened during the remainder of the piston stroke.

More specifically described, the present invention provides an improvement over a molten glass severing mechanism of the type disclosed in my Patent No. 2,218,970 of October 22, 1940.

An object of the present invention is to provide a molten glass severing mechanism of the character described which has sufficient power to cut through large columns or streams of viscous glass smoothly so as to sever large and heavy molten charges cleanly therefrom.

Charges weighing 28 lbs. or more can be severed from a column of viscous molten glass by glass-cutting shears of the present invention.

A further object of the invention is to provide a shear mechanism comprising co-operative relatively moving components operatively supporting and swinging co-operative pivoted shear blade carrying arms under a high torque and with sufficient power to drive the closing shear blades through a thick column or mass of viscous molten glass and then to open as a smoothly reversed continuation of their closing strokes, all without jolting or slamming of parts and without use of stops to limit closing movements of the shear blades.

A further object of the invention is to provide a glass severing mechanism of the character described having pneumatic control means operatively associated with the air motor so as to assure periodic cutting strokes of the shear blades at uniform time intervals.

A further object of the invention is to provide a glass severing mechanism of the character described having means to effect during continued operation any required adjustment of the working positions of the shear blades in relation to the glass discharge outlet of a feeder to which the mechanism has been applied.

Other objects and advantages of the invention hereinafter will be pointed out or will be apparent from the following description of an illustrative embodiment of the invention as shown in the accompanying drawings, in which:

Fig. 1 is a side elevation of shear mechanism of the invention operatively applied to the bottom of a glass feeder forehearth with the shear blades positioned to close below and in line with the glass discharge outlet of the feeder spout, only a fragmentary portion of the feeder forehearth and spout being shown, the spout being in vertical section;

Fig. 2 is a relatively enlarged horizontal sectional view of the glass severing mechanism from the plane indicated by the line 2—2 of Fig. 5, the shear arms being partially broken away and their free outer end portions and the shear blades being omitted;

Fig. 3 is a transverse section through the shear mechanisms along the line 3—3 of Fig. 4, but on a larger scale, the view showing particularly the provisions for pivotally supporting the shear arms;

Fig. 4 is a section along the line 4—4 of Fig. 5, showing closed positions of the shear blades in full lines and their open positions in dot-and-dash lines, a portion of the structure shown in the lower part of the view being broken away to disclose details which otherwise would be hidden;

Fig. 5 is a longitudinal section along the line 5—5 of Fig. 4, with parts shown in side elevation;

Fig. 6 is a somewhat schematic, mainly sectional view of air piping and cam actuated valves of the fluid pressure supply and exhaust system for the fluid pressure motor; and Fig. 7 is a diagram showing sequence and timing of the operations of the valves of the fluid pressure supply and exhaust system for two successive strokes of the motor piston and successive regularly timed shear cuts.

Generally described, the improved shear mechanism comprises a pair of shear arms 1 and 2, respectively, the free ends of which carry co-operative shear blades 3 and 4, respectively, as best seen in Fig. 4. The shear arms 1 and 2 are pivotally supported adjacent to their ends opposite the blades for swinging movements about adjacent vertical axes, being mounted as hereinafter will be particularly described on vertical spindles 5 and 6, respectively, Fig. 3. These spindles are non-rotatably mounted in vertically disposed tubular holders 7 and 8, respectively, Fig. 3, carried by a bracket 9, Figs. 1, 3, 4, and 5, projecting from one end of a cylinder 10, which forms part of an air motor generally designated 11 for operating the shear arms.

The shear arms 1 and 2 are provided adjacent to their pivotally supported ends with outturned actuated arms or knuckles 12 and 13, respectively, operatively connected by adjustable coupling mechanisms later to be described and indicated at 14 and 15, respectively, Figs. 2 and 4 with links 16 and 17 respectively, extending to and operatively mounted at their rearward ends on upright crank pins 18 and 19, respectively, on horizontal crank arms 20 and 21, respectively, carried by projecting upper ends of vertical crank shafts 22 and 23, respectively. These crank shafts are housed in opposite lateral wing portions 24 and 25, respectively, of an intermediate transmission housing 26 which is located between and operatively connects the front motor cylinder 10 with a similar rear motor cylinder 27.

The crank shafts 22 and 23 carry pinions 28 and 29, respectively, enmeshed with rack bars 30 and 31, respectively, carried on the opposite sides of a horizontal piston rod 32 which extends through the transmission housing into the cylinders 10 and 27 and is rigidly joined at its opposite ends to a piston 33 in the cylinder 10 and a piston 34 in the cylinder 27, respectively. The rack bars may be integral portions of the piston rod or formed separately and fixed thereto in any suitable known manner.

The shear mechanism is suspended adjacent to its rearward end, which is remote from the shear blades, from the bottom of a forehearth 35, Fig. 1, by a suspension mechanism 36 for limited swinging adjustment about a transverse horizontal axis $a$, Figs. 1 and 5 and for angular swinging adjustment about a vertical axis indicated at $b$, Figs. 2 and 5. Co-operative with this rear suspension mechanism is a front suspension mechanism generally indicated at 136, Figs. 1 and 5, including a horizontal suspension plate 37 fastened to the bottom of the forehearth for limited bodily adjustments in its plane fore-and-aft and transversally as hereinafter will be described. A pendant rigid stud 38 depends downwardly through a slot 39 in the bracket 9 and carries a vertically adjustable supporting sleeve 40 located in the slot and having an externally enlarged or flanged lower end portion 41 on which the slotted portion of the bracket rests so that the bracket and the parts supported thereby are supported by the sleeve 40 at a level which can be adjusted within limits by vertical adjustment of the sleeve 40 on the stud 38. This is done by manipulating an adjusting nut 42 which is in threaded engagement at 43 with the stud 38 beneath an anti-friction ball bearing unit 44 which is located on the stud between the flanged lower end 41 of the sleeve 40 and the top of the nut 42 as shown in Fig. 5.

The shear mechanism may thus be positioned so that its blades close at a downward extension of the axial or center line of a glass discharge outlet 45 in a feeder spout 46, and at a predetermined distance below that outlet.

The air motor 11 is operated by admitting air under pressure to the remote or distal ends of the cylinders 10 and 27 back of the pistons therein, alternately, at timed intervals, and venting air from each of said cylinder ends at an appropriate time, preferably both before and during application of air under pressure to the other. For this purpose, each of the distal end portions of the cylinders 10 and 27 may be provided with a combination air intake and cushioning air exhaust arrangement of ports as generally indicated at 47 and as shown in detail for the cylinder 10 in Fig. 5. The arrangement is conventional and per se forms no part of the present invention.

A pressure air supply and exhaust system comprising air piping and cam-actuated valves as shown in Fig. 6 and as hereinafter further described coacts with the arrangements of ports in the end portions of the cylinders to time and control the periods of application of pressure air to and exhaust of pressure air from the cylinders.

The transmission housing may be partly filled with oil 48 between the pistons 33 and 34 so that accessible surfaces of the connected pistons and other parts of the air motor and transmission will be lubricated by oil and oil mist splashed and churned up by the moving pistons and air blowing past them.

It will be apparent that the connected pistons together comprise the piston of the air motor and that each stroke of the piston of the air motor will cause swinging movements of the shear arms from their open positions to close the shear blades for a glass cutting action and then reversed swinging movements of the shear arms to open the blades. Each stroke of the air motor piston rotates the crank shafts somewhat less than 360°. With every stroke a cutting cycle is completed. The shear blades are closed to complete their cut when the air motor piston is at about its mid-stroke, giving them maximum cutting power and a motion that is smooth and continuous, even during reversal.

Details of the components of the shear mechanism as thus generally described will now be pointed out.

The shear blades 3 and 4 are of a V-shape cutting edge type and project laterally toward each other from the free forward ends of the shear arms, to which they are attached by conventional adjustable blade mounting mechanisms indicated at 49 and 50 respectively, in Fig. 4. The blades can be adjusted in relation to each other and to their respective arms to a certain degree to supplement other adjustments hereinafter to be described so as to assure exact centering of the cutting axis of these blades in line with the axis of the feeder outlet 45 and so that the cutting edges of the blades will sweep evenly across each other during their closing movements. In the example shown, the blade 4 is the upper of the two blades.

The pivotally supported rearward end of each shear arm is provided with vertically aligned and spaced pairs of upper and lower bearing boxes 51 and 52, respectively, Fig. 3. An anti-friction roller-type bearing unit 53 is mounted in each bearing box 51 around the reduced upper end portion $5a$ or $6a$ of the associate vertical spindle 5 or 6. Similarly, an anti-friction roller-type bearing unit 54 is mounted in each of the lower bearing boxes 52 around and in supporting relation to the reduced lower end portion $5b$ or $6b$ of the associate spindle 5 or 6. It will be noted that the vertical distance between the corresponding, vertically aligned bearing boxes 51 and 52 is somewhat greater than the vertical extent of the holders 7 and 8 through which the spindles 5 and 6, respectively, extend. This permits independent vertical adjustment of a spindle and the shear arm carried thereby relative to its holder to adjust the tension of the cutting edges of the shear blades on each other as they close. In the present example, the spindle 5 and the shear arm carried thereby, which is the shear arm carrying the lower shear blade, is vertically adjustable. To this end the holder 7 may be lined with a bushing 55 to serve as a slide bearing and a pin 56 may project inwardly from such holder and its bushing into a vertical slot 57 in the spindle 5 to limit the independent vertical adjusting movement and to prevent angular turning of the spindle relative in its holder. To effect such vertical adjusting movement, an adjusting screw 58 may be journaled in a bearing 59 of the split collar type in a stationary bracket arm 60 attached at 61, Fig. 4, to the shear arm bracket 9. This adjusting screw 58 extends through an opening 62 in the bottom of the associate bearing box 52 and has a threaded upper end portion 63 screwed into a threaded axial bore 64 provided in the spindle 5. The adjusting screw 58 has its lower extremity squared or otherwise formed as indicated at 58a to be engaged by a wrench or other suitable tool and turned when the split collar type bearing 59 has been loosened sufficiently to permit this action. In consequence, the spindle 5 and the parts carried thereby will be lifted relative to the shear arm bracket 9 and relative to the other spindle and the upper shear arm. The spindle 6 may be releasably fixed to its holder 8 by suitable fastening means 100, Figs. 3 and 4.

The level at which the shear blades will close may be adjusted in a range extending from approximately 2" below the feeder orifice to 1" below such orifice although this range may, of course, be varied. The nut 42 of the front suspension mechanism 136 may be adjusted on the stud 38, Fig. 5 to adjust this level.

The plate 37 of the front suspension is provided with four oversized holes 64 adjacent to the corners thereof and cap screws 65 extend through these holes and are threaded into fixed bosses 66 depending from the forehearth casing bottom plate 67. As shown in Fig. 2, adjustable thrust screws 68 are threaded through depending fixed lugs 69 on the casing bottom 67 to bear against the edge of the plate 37 remote from shear blades, i. e., its rearward edge. Similarly, adjusting screws 70 are threaded through depending fixed lugs 71 against the opposite or front edge of the plate 37. An adjusting screw 72 is threaded through a fixed depending lug 73 against one side edge of the plate 37 and a similar adjusting screw 74 is threaded through a fixed depending lug 75 against the other side edge of the plate 37. By loosening the screws 70 and tightening the screws 68, the plate 37 and is depending stud 38 may be adjusted slightly in a forward direction. By loosening the screws 68 and tightening the screws 70 a reverse or rearward horizontal adjustment may be effected. These two adjusting movements will position the stud 38 in the slot 39 in bracket 9. By loosening one of the side adjusting screws 72 or 74 and tightening the other, the shear mechanism may be swung slightly in a lateral direction, this being an angular turning movement about the vertical axis $b$ of the rear suspension mechanism. The adjustments just described may be employed to center the cutting axis of the shear blades with relation to the glass outlet of the feeder.

The rear suspension mechanism comprises a plate 76 rigidly secured, as by fastening elements 77, against the forehearth casing bottom plate 67. A block 78 is mounted beneath the plate 76 on a depending threaded fixed vertical stud 79 for angular turning adjustment about the axis of such stud, this being the vertical axis $b$ hereinbefore mentioned. The block carries oppositely extending aligned studs or trunnions 80 on which are mounted the apertured laterally embossed upper ends 81 of suspension bars 82. The lower end portions of these bars are fixed, as by fastening screws 83 and dowel pins 84 to flattened vertical faces 85 of lateral bosses 86 on the opposite sides of the rear cylinder 27. The rigid connection of the bars 82 with the cylinder 27 affords rigidity which is desirable.

The mechanism also includes means to adjust the overlap of the blades when they are closed. Each of the links 16 or 17 may be formed for a pre-setting adjustment of its length in a known manner, as by being formed to combine threadedly connected overlapping sections 16a and 16b or 17a and 17b, the adjustment of each such link being maintained by a jam nut 16c or 17c. Each link has its rearward end formed with an appropriate bearing eye 87 for mounting on its crank pin 18 or 19. At its forward end, each link 16 or 17 terminates in an eccentric strap 88 encircling an eccentric 89 formed on a vertical wrist pin 90 by which the link is operatively coupled to a lateral knuckle or arm 12 or 13 on the rearward end of a shear arm 1 or 2. The arrangement is shown in Fig. 3 in which each eccentric strap 88 is shown on an eccentric 89 formed on the intermediate portion of the vertical pin 90 which is journaled both above and below the eccentric in vertically spaced bushed bearings 12a and 12b or 13a and 13b for the knuckles 12 and 13, respectively. These bearings may be of the split collar type as shown for bearings 12a and 13a in Fig. 2. The pins 90 have reduced downwardly projecting lower end portions 90a on which pinions 91 are fixed. These pinions are enmeshed with worms 92 having supported end portions 92a journaled in horizontal bearings 93 formed in supporting blocks 94 which are mounted on vertical pivot pins 95 depending from the underside of the knuckles 12 and 13, respectively. The opposite ends of the worms 92 carry hand wheels 96.

By grasping and turning a hand wheel 96, an operator may effect turning of the associate eccentric pin 90 about its axis and this will effect a lateral swinging of the connected shear arm to move the cutting edge of the blade on the free end of that arm toward or away from the other blade. This adjustment may be effected for each blade to assure the desired extent of overlap when the blades are closed with their cutting axis centered in relation to the glass discharge outlet of the feeder. The overlap adjustment may be made without interrupting operation of the shear mechanism, as when the shear arms are at the limits of their movements apart. The adjusting mechanisms are carried by the pivotally mounted arms adjacent to their pivotal axes where the amplitude of their swinging movements are slight. The engagement of each worm 92 with its pinion 91 may be maintained by spring means such as indicated at 97 in Fig. 4. The worms may, of course, be mounted on the shear arm knuckles to engage their pinions at places angularly different from that shown, as at the rear of the vertical wrist pins.

The link 16 may slide through a guide 98 projecting from a bracket 99 secured on the top of the main shear arm bracket 9, as shown in Fig. 4.

Referring now to Fig. 6, a timing valve 101 has an intake chamber 102 receiving air constantly from a supply pipe 103 containing air under pressure, as at a maximum line pressure of 30 lbs. per sq. inch. An outlet chamber 104 in valve 101 may receive air from chamber 102 through a connecting port 105 when a spring pressed valve 106 is moved to the left in Fig. 6 from its normally closed, seated position in the port 105. Valve 106 has a rigid stem 107 extending through chamber 104 and through an opening 108 in the right hand end wall of the valve casing so as to project therefrom to a position in working relation to the periphery of a shear cut timing cam 109 which is fast on a shaft 110. The shaft 110 may be the usual feeder cam shaft of a conventional glass feeder or it may be a separate shaft geared to the feeder cam shaft by suitable known means, not shown, to rotate in unison with and at the same speed as the feeder cam shaft. The cam 109 has a high peripheral portion or rise 109a which will engage with and bias the end of valve stem 107 to the left in Fig. 6 so as to move valve 106 from its seat and maintain the valve 101 open while shaft 110 is rotating through part of a complete revolution, as through 45°.

When valve 101 is open, air under pressure will pass from its outlet chamber 104 through valve outlet pipe 111 to an air intake chamber 112 formed in a block 113 and common to two similar switching valves 114 and 115, respectively, provided in that block. Each of these switching valves comprises a spring pressed valve element 116 or 117 normally seated in the inner end 118 or 119 of a passage 120 or 121 extending in the block 113 from a wall of the chamber 112 to the exterior of the block. A rigid stem 122 or 123 on the valve 114 or 115 extends through the passage 120 or 121 to project beyond the outer end of the passage as indicated at 124 or 125. The stems 122 and 123 where they extend through the passages 120 and 121, respectively, are fluted or otherwise formed in a known manner to provide longitudinal air passages as indicated at 126 and 127, respectively, between themselves and the walls of the passages for flow of air from the intake chamber 112 to lateral passages 128 and 129, respectively, extending in the block to the exterior thereof, when the valves 116 and 117, respectively, have been opened. The projecting ends 124 and 125 of the valve stems are larger than the adjacent ends of the passages 120 and 121, respectively, and are formed with shoulders at 130 and 131, respectively, facing the block and adapted to seat against the block to close the adjacent ends of the passages when the connected valves 116 and 117, respectively, are open. The projecting ends 124 and 125 serve as exhaust valves which are closed when the valves 116 and 117 are open and are open when valves 116 and 117 are closed.

The lateral passage 128 is connected by a pipe 132 to a port 133 included in the air intake and exhaust system of ports 47 at the front end of cylinder 10. See Fig. 5. The lateral passage 129 is connected by a pipe 134 with a port 135 of the like air pressure supply and exhaust system at the rearward end of cylinder 27. The elements 124 and 125 are positioned in operative relation to cams 137 and 138, respectively, on a cam shaft 139 having a driven connection at 140 with the cam shaft 110 so as to be driven at half the speed of the latter. The cams 137 and 138 have lobes or high portions 137a and 138a, respectively, which are adapted to engage with the projecting valve ends 124 and 125, respectively, so as to bias the valve assemblies 116—122—124 and 117—123—125 upwardly as viewed in Fig. 6 to open valves 116 and 117 and close valves 124 and 125, respectively. These cam lobes in the example shown are 180° in extent and are 180° out of phase with each other.

The operation of the air supply and exhaust system for driving the piston of the air motor so as to obtain successive shear cuts at exactly the same time interval apart will be understood by reference to the chart of Fig. 7 in conjunction with Fig. 6. The outer circle, 141, of the chart represents two successive complete revolutions of the timing valve cam shaft 110 during which a single revolution of the cam shaft 139 for the switching valves, indicated by the inner circle 142, and two successive strokes of the air motor piston—a forward stroke and a return rearward stroke—will be effected. At positions indicated at 0°—0° on the circles of the chart, the timing valve 101 is closed, the air supply valve 116 of the front cylinder switching valve is closed and its exhaust valve 124 is open, and valve 117 of the rear cylinder switching valve is open and its exhaust valve 125 is closed. Operating pressure air cannot pass the rear cylinder, however, until the timing valve has been opened but exhaust of pressure in excess of atmospheric air pressure can take place from the front cylinder. Opening of the timing valve 101 is indicated at 22½° on outer circle 141. This is just after the stage indicated by the positions of the parts in Fig. 6. Opening of the timing valve causes a forward power stroke of the air motor piston and the shear cut will occur at about the mid-stroke indicated at 27½° on the outer circle of the chart. Cushioning of the final portion of this forward power stroke will be effected by compression of atmospheric air pressure remaining in the front cylinder which is still connected to exhaust. At 67½° the timing valve is closed. At 180° on the inner circle, the cam shaft 139 for the switching valves will have completed half a revolution and the cams thereon will reverse the positions of the switching valves. That is, the rear cylinder of the air motor will be connected to exhaust and the front cylinder will be connected for flow of air thereto when the timing valve 101 next is tripped. The timing valve cam shaft will have completed one revolution. At 22½° of the next revolution, it will be opened and air will be supplied to the front cylinder to drive the air motor piston on its rearward power stroke. The shear cut will occur at 27½° in the outer circle when about half of the rearward power stroke will have been completed. The remainder of such stroke will of course open the shears. The air will be cut off from the front cylinder by closing of the timing valve 101. At 0° on the inner circle a revolution of the cam shaft 139 for the switching valves will be completed and the switching valves will again be reversed. The sequence of events just described will then be repeated. There will be exactly the same time interval between each two successive shear cuts. This would be difficult or impossible to assure, at least for continued service of substantial duration, were the instants of successive shear cuts determined by the operation of two different timing cams instead of by a single timing cam and co-operative switching valve cams as just described.

Many changes in and modifications of the details of the illustrative embodiment of the invention will now be obvious to or readily occur to those skilled in the art and I, therefore, do not wish to be limited to such details.

I claim:

1. Glass severing mechanism for a glass feeder comprising a fluid pressure cylinder, a piston reciprocable therein, a projecting bracket fixed to one end of said cylinder, a pair of parallel tubular members fixed to the projecting bracket in adjacent side by side relation with their axes lying in a plane approximately perpendicular to the extended axial line of the cylinder, a pair of spindles respectively mounted in the tubular members and each having end portions projecting beyond the opposite ends of its tubular mounting member, a pair of shear arms, each having a pair of spaced bearing boxes fixed to an end thereof and respectively fitting over the projecting opposite ends of a spindle, anti-friction bearing units operatively mounted in the bearing boxes around the spindle ends therein so that the shear arms are pivotally mounted on said spindles to swing about the axes of the spindles toward and away from each other, co-operative shear blades mounted on the outer ends of said shear arms in positions to be closed and opened by swinging movements of the shear arms toward and away from each other respectively, and gearing and linkage operatively connecting the shear arms with said piston to swing the shear arms on reciprocation of the piston in said cylinder to close the shear blades at approximately the mid-stroke of the piston in either direction in the cylinder and to open said shear blades during continued movement of the piston in the same direction.

2. Glass severing mechanism as defined by claim 1, wherein said shear blades overlap at their cutting edges in closing and one of the spindles is axially adjustable in its holder and relative to the other spindle to adjust the blade on the arm supported thereby relative to the other shear blade to adjust the tension between the shear blades when closing, and an adjusting screw rotatably supported at one end of said axially adjustable spindle and in operative engagement therewith so as to adjust the spindle axially in its tubular member when the adjusting screw is turned about its axis.

3. A shear mechanism as defined by claim 1 and, in addition, a rear suspension means attached to said cylinder adjacent to its end remote from said bracket and attachable to an overhead stationary support at the bottom of a glass feeder and a front suspension means adjustably and supportingly connecting the bracket to a more forwardly located overhead stationary support also at the bottom of the feeder, whereby to support said cylinder with its axis approximately horizontal and the spindles with their axes approximately vertical, said rear suspension means and said front suspension means being positioned in relation to each other and to a glass discharge outlet in the bottom of the feeder to position the shear blades at opposite sides of a downward extension of the axial line of the feeder outlet when the blades are open and being cooperative to assure closing of the blades at that line at a level spaced a predetermined distance below the outlet.

4. A shear mechanism as defined by claim 3 wherein the rear suspension means is constructed and arranged to permit limited bodily adjusting movements of said cylinder and the parts carried thereby about a horizontal axis located above the level of the cylinder and an angular adjusting movement of said cylinder and parts about a vertical axis intersecting the horizontal axis and wherein the front suspension means includes a horizontal plate supported above the bracket and connected therewith and adjusting means to adjust said plate in its plane and the bracket and parts movable therewith horizontally, whereby to adjust the shear blades relative to the feeder outlet.

5. A shear mechanism as defined by claim 3 wherein said front suspension means includes a horizontal plate attached to its overhead stationary support and a vertical stud fixed to the plate and depending therefrom, said bracket is formed with a vertical slot through which said stud depends, a vertically adjustable sleeve on said stud has a portion located in under-supporting relation to the bracket and a nut is provided on the stud in threaded engagement therewith beneath the sleeve for adjusting the sleeve and the bracket supported thereby vertically on the stud and for maintaining each such vertical adjustment, whereby to vary the level of the shear blades relative to the feeder outlet.

6. A glass severing mechanism comprising a pair of shear blades, a pair of shear arms carrying said shear blades, a horizontally disposed fluid pressure cylinder, a bracket at one end of said cylinder fixed thereto, means pivotally mounting said shear arms on said bracket for horizontal swinging movements toward each other to close the blades and away from each other to open said blades, a piston reciprocable in said cylinder, a pair of vertically disposed wrist pins pivotally mounted on the shear arms laterally outward from and adjacent to their pivotal connections with said bracket, eccentrics fixed on sid wrist pins, eccentric straps encircling the eccentrics, linkage and gearing operatively connecting said straps and said piston, and adjusting means operable to turn said wrist pins and eccentrics angularly about the axes of the wrist pins and relative to the shear arms to effect adjusting movements of the shear arms about the axes of their pivotal connections with the bracket to vary the extent of overlap of the shear blades carried by said arms when said blades are closed by a stroke of the piston in said cylinder.

7 A shear mechanism as defined by claim 6 wherein said adjusting means for said wrist pins comprises pinions fixed on the wrist pins, worms rotatably mounted on the shear arms in engagement with the pinions, and manually operable elements fixed to said worms.

References Cited in the file of this patent

UNITED STATES PATENTS

| Number | Name | Date |
|---|---|---|
| 1,806,743 | Cramer | May 26, 1931 |
| 1,953,030 | Sterrett | Mar. 27, 1934 |
| 1,994,123 | Curtis | Mar. 12, 1935 |
| 2,158,708 | Stuckey | May 16, 1939 |
| 2,218,970 | Honiss | Oct. 22, 1940 |
| 2,518,871 | Craig | Aug. 15, 1950 |